United States Patent [19]

Matsuura

[11] 4,452,004
[45] Jun. 5, 1984

[54] ANIMAL TRAP

[76] Inventor: Masatoshi Matsuura, 1382-88, Shikiji-Cho, Ono-Shi, Hyogo-ken, Japan

[21] Appl. No.: 400,465

[22] Filed: Jul. 21, 1982

[30] Foreign Application Priority Data

Mar. 25, 1982 [JP] Japan ............................. 57-42882[U]

[51] Int. Cl.³ ............................................. A01M 23/18
[52] U.S. Cl. ......................................................... 43/61
[58] Field of Search ..................................... 43/61, 67

[56] References Cited

U.S. PATENT DOCUMENTS

| | | | |
|---|---|---|---|
| 233,917 | 11/1880 | Boice | 43/67 |
| 344,551 | 6/1886 | Snell | 43/61 |
| 383,972 | 6/1888 | Mittler | 43/61 |
| 443,970 | 12/1890 | Mellon et al. | 43/61 |
| 1,625,027 | 4/1927 | Hulse | 43/67 |
| 1,996,872 | 4/1935 | Long | 43/61 |
| 3,975,857 | 8/1976 | Branson et al. | 43/61 |

Primary Examiner—Nicholas P. Godici
Assistant Examiner—P. Weston Musselman, Jr.
Attorney, Agent, or Firm—Koda and Androlia

[57] ABSTRACT

A trap for capturing animals comprising a main box, step boards, doors and anchoring members. The step boards are pivotally held to the main box, and the anchoring members attached to the step boards are designed so as to keep the doors open by anchoring them. When the step boards are pressed down by the weight of an animal passing through the main box, the doors are released from the engagement with the anchoring members and caused to close the entrances to confine the animal in the main box. Since the animal trap of the invention needs no bait for capturing an animal, it may be set up without any difficulty on the running route of the animals.

3 Claims, 2 Drawing Figures

ANIMAL TRAP

BACKGROUND OF THE INVENTION

1. Field of the Invention

The present invention relates to a device for capturing animals and more particularly to an animal trap of a type to capture animals, mainly rats, by utilizing the weight of the animals trying to pass through the trap.

2. Prior Art

Generally, a device for capturing animals such as a rat trap is built so that a bite on a bait by an animal entering into the trap causes the door of the trap to close or applies a shock or pressure to the animal which results in death.

However, such types of traps require the bait to be placed in the trap. Therefore, depending on the type of food or the condition thereof, animals (for example, rats) may not be attracted to the trap. In addition, it happens frequently that if the bait is not placed properly, only the bait is taken by the animals, while the device does not work to achieve the purpose of capturing the animals.

SUMMARY OF THE INVENTION

Accordingly, it is the general object of the present invention to provide an animal trap that does not require any food enticement and is capable of capturing animals, primarily rats, by merely placing the device on their running route.

In keeping with the principles of the present invention, the objects of this invention are accomplished by a unique structure for an animal trap including a main box, step boards, doors and anchoring members installed in the main box. The trap is arranged such that the step boards are pivotally attached to the main box, and the anchoring members are fixed to the step boards in order to keep the swingably attached doors open by anchoring them; when the step boards are pressed down by the weight of the animal, the doors are released from the engagement with the anchoring members and caused to close the entrances to confine the animals in the main box.

BRIEF DESCRIPTION OF THE DRAWINGS

The above-mentioned features and objects of the present invention will become more apparent by reference to the following description taken in conjunction with the accompanying drawings, wherein like reference numerals denote like elements, and in which.

DETAILED DESCRIPTION OF THE INVENTION

Figure 1:
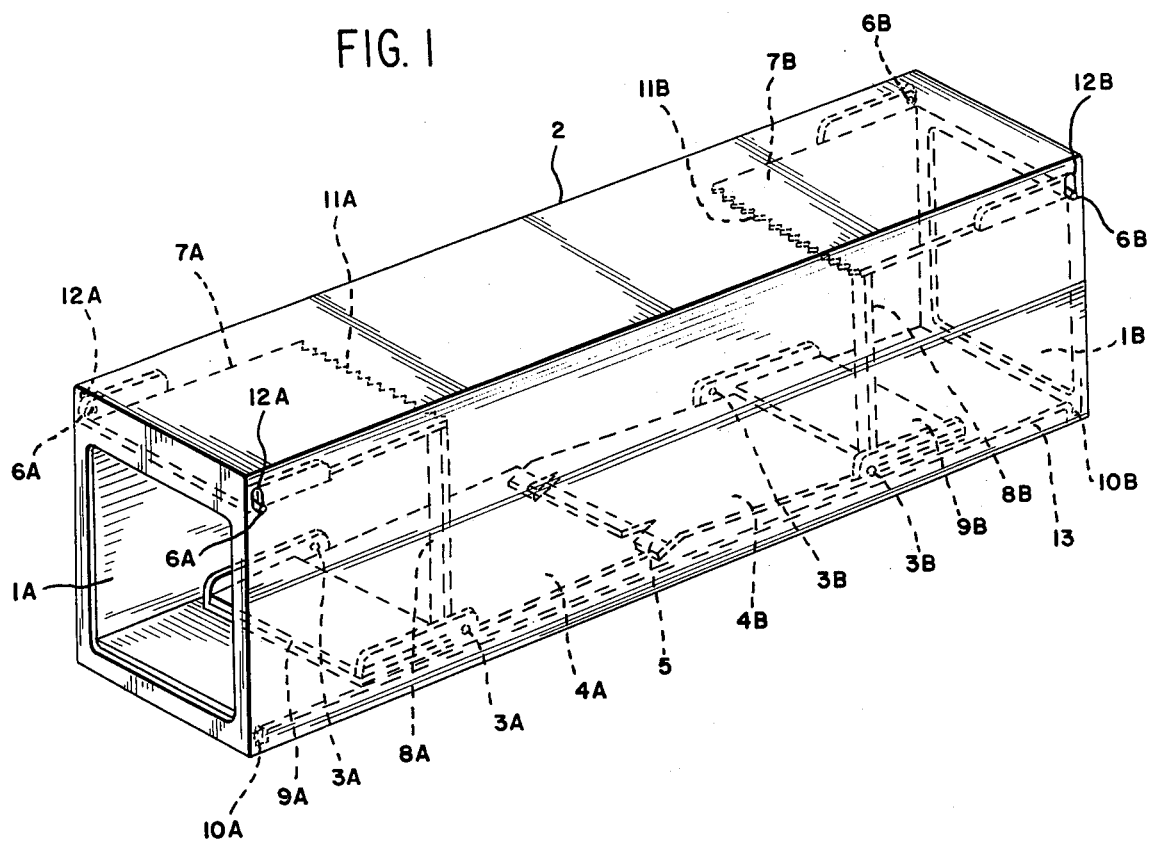
FIG. 1 is a perspective view showing an animal trap according to the present invention.
Figure 2:
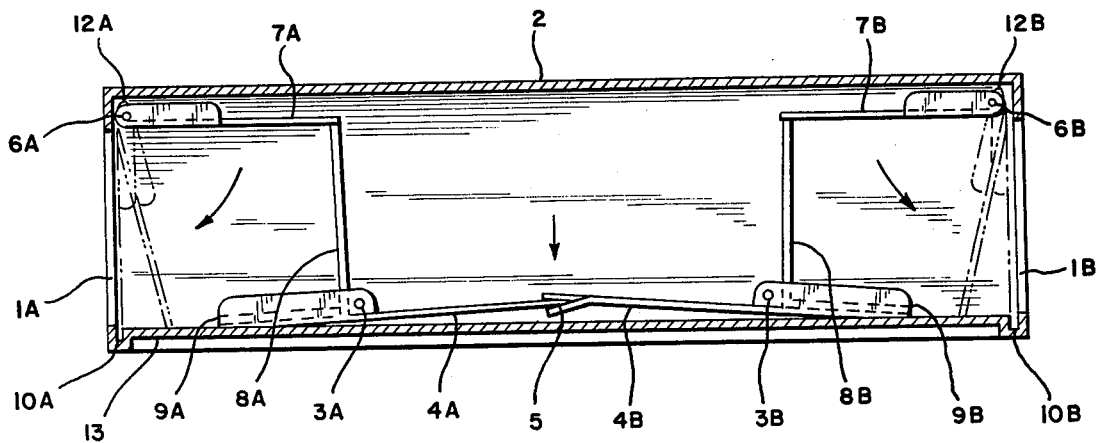
FIG. 2 is a side view showing the animal trap of the present invention with one of the side walls taken off and the doors closed.

Referring to FIGS. 1 and 2, at the ends of each side of a main box 2 are made entrances 1A and 1B through which animals may enter the box 2. Close to the bottom plate 13 of the box 2 is provided a pair of step boards 4A and 4B on which the animals can make passage. The step boards 4A and 4B are arranged such that the inner end of the step board 4A is held between the inner end portion 5 of the other step board 4B. As a result, these two step boards 4A and 4B are engaged with each other all the time to make it possible for the animals to pass through. The respective step boards 4A and 4B are pivotally held in a manner to be able to swing, by fixing supporting axles 3A and 3B provided respectively at locations near the bottom plate 13 of the box 2, as the fulcrums. To the respective step boards 4A and 4B the heavy boards 9A and 9B disposed outside (on the entrance 1A and 1B side) of the supporting axles 3A and 3B are fixed, in order to give a momentum to the step boards 4A and 4B to tilt towards the entrances 1A and 1B, respectively. Also, inside of each entrance 1A and 1B, the doors 7A and 7B are installed. Supporting axles 6A and 6B for the doors 7A and 7B are embedded at the inner side of respective entrances 1A and 1B. The axles 6A and 6B are inserted and supported by vertically long holes 12A and 12B formed in the upper portions of the side walls of the box 2 by arranging that these supporting axles 6A and 6B can move vertically. Furthermore, anchoring members 8A and 8B for anchoring the edges of the doors 7A and 7B in order to keep the doors 7A and 7B open are vertically attached to the step boards 4A and 4B.

With the above construction, when the step boards 4A and 4B are pressed down by the passage of animals at the portions inside of the supporting axles 3A and 3B thereby causing those portions to move downward, the engaging portions of the anchoring members 8A and 8B engaging with the doors 7A and 7B rotate and release the engagement with the doors 7A and 7B, thus causing the doors 7A and 7B to rotate in the direction to close the entrances 1A and 1B respectively.

In addition, in the lower portions at both sides of the box 2, grooves 10A and 10B are provided downward in order to insert the lower ends of the doors 7A and 7B into them.

Moreover, each of the doors 7A and 7B may be provided with sawtoothed portions 11A and 11B along the edges on the opposite sides from the supporting axles 6A and 6B.

In use, the animal trap according to the present invention is placed in the passage of animals, such as rats, with the doors 1A and 1B open by anchoring the edges of the doors with the upper end portions of the anchoring members 8A and 8B installed on the step boards 4A and 4B. At this moment, the respective step boards 4A and 4B are tilted towards the entrances 1A and 1B as is shown in FIG. 2.

In this state, if an animal enters into the box 2 from either side of the entrances 1A and 1B by trying to pass through the inside of the box and steps onto the step board 4A or 4B at the portion inside of the supporting axle 3A or 3B, due to the weight of the animal, the end portion 5 of the step boards 4A and 4B are pressed to go down, causing the doors 7A and 7B at each side to be released from engagement with the anchoring members 8A and 8B, respectively, and to rotate to the closing direction. Then, the edge portions of the doors stop once by coming into contact with the bottom plate 13 of the box 2. At this time, if the locked up animal fusses up and down in panic, the doors are pushed from the inside, and the supporting axles 6A and 6B for the doors located in the upper portions of the box 2 move up slightly along the long holes 12A and 12B. Then, when the edges of the doors reach to and enter the grooves 10A and 10B, the doors 7A and 7B go down and close the respective entrances 1A and 1B. Once coming to this state, the doors 7A and 7B stay closed unless the supporting axles 6A and 6B for the doors or the door surfaces are lifted by outside force. Consequently, the doors are not opened no matter how violently the animal in the trap moves around.

Also, in rare occasion, even if a part of the body of the animal is caught between the bottom plate 13 of the box 2 and the edge of the door 7A or 7B, because the lower end of the door works in the direction to press down (that is, to bite into) the animal's body, the animal is clutched between the bottom plate 13 and the door 7A or 7B. Therefore, it becomes impossible for the animal to escape in spite of its effort to get away. Furthermore, if the edges of the doors 7A and 7B are formed in sawtoothed shape, the foregoing effect is further secured.

In the animal trap according to the present invention, for giving the momentum to tilt a pair of step boards toward the entrances, respectively, gravity is utilized by the use of heavy boards 9A and 9B. However, this is not the only manner to be used for this invention, and needless to say, the momentum may be provided by a spring.

As mentioned in the foregoing detailed description, the animal trap according to the present invention does not require to place the bait in it. Therefore, various disadvantages accompanying the use of the bait may be eliminated. Also, in the application of the trap according to this invention for capturing rats, if the walls of the box are made of opaque metal plates, it may coincide with the nature of the rat to prefer to pass through the dark route, thereby increasing the capturing effect markedly.

I claim:

1. An animal trap comprising:
    a main box having entrances at each end thereof;
    a pair of vertically elongated holes provided on opposing sides of each said entrances of said main box;
    two or more doors coupled to supporting axles disposed respectively in said elongated holes adjacent said entrances;
    a pair of step boards coupled to supporting axles installed in pairs respectively near a bottom plate of said main box, each of said boards being weighted to tilt down towards said entrance to engage with the other step board at their inside edges;
    a groove for inserting only a lower edge of each door thereinto provided in said bottom plate of said main box along the lower side of each of said entrances; and
    anchoring members vertically coupled to said step boards so as to anchor said door to keep the door open;
    whereby said animal trap is arranged such that when said step boards are pressed down at the portions inside of said said supporting axles due to the weight of an animal, the anchorage of the door with anchoring member is released causing the doors to rotate downwardly and snap into said grooves to thereby snap shut said doors to close said entrances.

2. An animal trap according to claim 1, wherein said step boards are weighted to tilt down towards the entrances, respectively, by designing the step boards such that the portions located at the entrance side of said supporting axles are heavier than the portions located inside of the supporting axles.

3. An animal trap according to claim 1, wherein each of the doors is provided with sawtoothed portions in the edge on the opposite side from the supporting axles for the door.

* * * * *